July 30, 1968  G. P. BAZELEY  3,394,971

BEARING

Filed June 13, 1966

Inventor
George Paulle Bazeley
By
Cushman, Darby & Cushman
Attorneys

United States Patent Office 3,394,971
Patented July 30, 1968

3,394,971
BEARING
George Paulle Bazeley, Burton-on-Trent, England, assignor to Rolls-Royce Limited, Derby, England, a British company
Filed June 13, 1966, Ser. No. 557,271
Claims priority, application Great Britain, July 9, 1965, 29,320/65
6 Claims. (Cl. 308—26)

ABSTRACT OF THE DISCLOSURE

A bearing comprises a non-rotating member spaced from fixed structure by an annular gap, and supported by spring rings which bridge the gap. Fluid is supplied under pressure to the gap to provide hydrodynamic squeeze film damping therein.

---

This invention concerns a bearing.

According to the present invention there is provided a bearing a nonrotating portion of which is spaced from fixed structure by an annular gap and is supported from the fixed structure by at least one spring ring which bridges said gap, the gap being adapted to receive fluid to provide hydrodynamic squeeze film damping between the said portion and the said fixed structure, the spring ring being secured to the said portion at a plurality of angularly spaced apart points, and the said spring ring being secured to the said fixed structure at a plurality of angularly spaced apart points which are angularly spaced from the respective first-mentioned points.

Means are preferably provided for supplying said gap with oil under pressure.

The spring ring is preferably constituted by a single integral member, although it could be constituted by a plurality of separate members which collectively form, in effect, a spring ring.

The spring ring is preferably connected to the said portion and to the fixed structure by respective sets of connectors, or groups of connectors, the members of which are equi-angularly spaced apart from each other, a connector, or group of connectors, of one set being disposed midway between the adjacent connectors, or groups of connectors, of the other set. Moreover, each said set is preferably constituted by two diametrically opposed connectors, or groups of connectors.

The bearing may comprise rolling elements in contact with inner and outer races, one of said races constituting said portion.

Each of the opposite axially spaced ends of the said one race may be connected to the fixed structure by a said spring ring.

The said one race is preferably the outer race.

The invention also comprises a gas turbine engine provided with a bearing as set forth above, the bearing rotatably supporting a shaft on which are mounted a compressor and a turbine of the engine.

Figure 1:
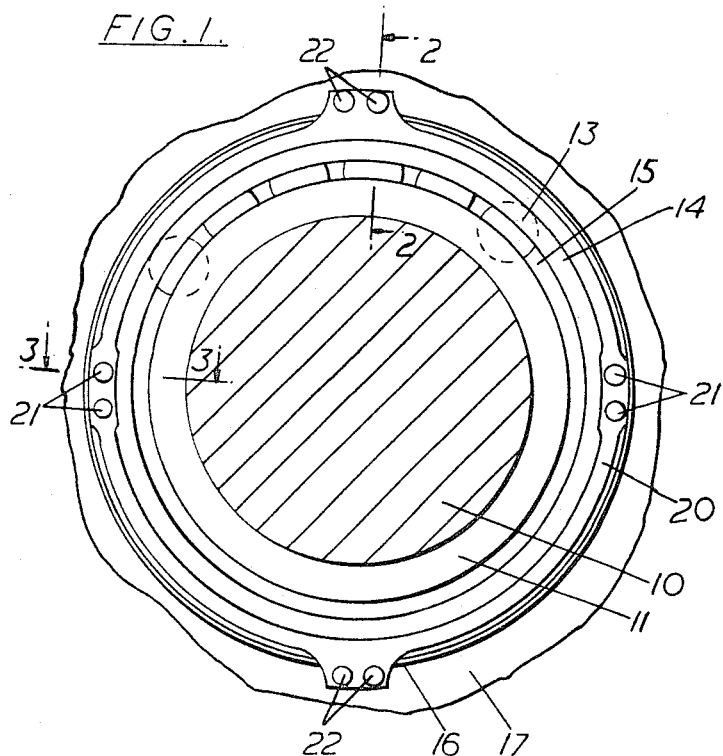
Figure 2:
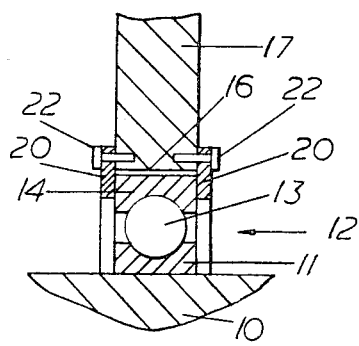
Figure 3:
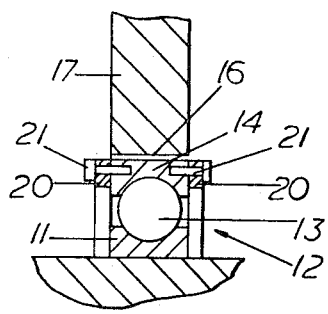

The invention is illustrated, merely by way of example, in the accompanying drawings, in which:

FIGURE 1 is a broken-away sectional view of a bearing according to the present invention, and FIGURES 2 and 3 are broken-away sections respectively taken on the lines 2—2 and 3—3 of FIGURE 1.

Referring to the drawings, a gas turbine jet engine (not shown) has a high pressure shaft 10 on which are mounted a high pressure compressor (not shown) and a high pressure turbine (not shown) of the engine.

The shaft 10 is mounted within and secured to an inner race 11 of a rear bearing 12. The bearing 12 has balls 13 which are in rolling contact with both the inner race 11 and with an outer race 14 of the bearing 12, the balls 13 being mounted in a cage 15.

The outer race 14 is spaced by a narrow annular gap 16 from a fixed bearing housing 17 which is secured to the engine casing (not shown).

Each of the opposite axially spaced ends of the outer race 14 is supported from the bearing housing 17 by a spring ring 20 which bridges the annular gap 16.

Each of the spring rings 20 is secured to the outer race 14 by pairs of bolts (or other connectors) 21 which are diametrically spaced from each other. Each of the spring rings 20 is, moreover, secured to the bearing housing 17 by pairs of bolts 22 which are diametrically spaced apart and which are spaced by an angle of 90° from each of the adjacent pairs of bolts 21.

The gap 16 is adapted to receive fluid to provide damping between the outer race 14 and the bearing housing 17, and for this purpose means (not shown) are provided for supplying the gap 16 with oil under pressure. The gap 16 is of very small width so that a hydrodynamic "squeeze film" will be formed therein.

If in operation the shaft 10 becomes unbalanced, the radial vibrations of the shaft will tend to be damped before being transmitted to the engine casing by virtue of the "squeeze film" of oil in the gap 16 and by virtue of the resilience of the spring rings 20. The spring rings 20, moreover, tend to maintain the bearing 12 and bearing housing 17 in alignment and thus to tend to ensure that the gap 16 is always correctly positioned.

Moreover, it can be shown that since each of the spring rings 20 is symmetrical about the two diameters on which the bolts 21, 22 are located, the stiffness of the spring rings 20 is substantially uniform in all radial directions.

I claim:

1. A bearing assembly comprising fixed structure, a bearing mounted in said fixed structure and having an axis, said bearing having a nonrotating portion spaced from the fixed structure by an annular gap, at least one spring ring radially resilient with respect to said axis which is external of and bridges said gap and which supports the bearing from the fixed structure, the gap containing fluid under pressure to provide a hydrodynamic squeeze film for damping between the said portion and the said fixed structure, means securing the spring ring to the said portion at a plurality of angularly spaced apart points, and means securing the said spring ring to the said fixed structure at a plurality of angularly spaced apart points which are angularly spaced from the respective first-mentioned points whereby the stiffness of the spring ring is substantially uniform in all radial directions of said axis.

2. A bearing assembly as claimed in claim 1 in which the spring ring is constituted by a single integral member.

3. A bearing assembly as claimed in claim 1 in which the spring ring is connected to the said portion and to the fixed structure by respective sets of connectors, the members of which are equi-angularly spaced apart from each other, a connector of one set being disposed midway between the adjacent connectors of the other set.

4. A bearing assembly as claimed in claim 3 in which each said set is constituted by two diametrically opposed connectors.

5. A bearing assembly as claimed in claim 1 in which the bearing comprises rolling elements in contact with inner and outer races, one of said races constituting said portion.

6. A bearing assembly as claimed in claim 5 in which each of the opposite axially spaced ends of the said one race is connected to the fixed structure by a said spring ring.

References Cited

UNITED STATES PATENTS

| 2,113,335 | 4/1938 | Wallgren | 308—147 X |
| 2,636,791 | 4/1953 | Fisher | 308—184 |
| 3,113,809 | 12/1963 | Eggmann | 308—26 |
| 3,122,399 | 2/1964 | Hunter | 308—26 X |
| 3,170,736 | 2/1965 | Wright | 308—26 |
| 3,322,474 | 5/1967 | Destival | 308—9 X |

MARTIN P. SCHWADRON, *Primary Examiner.*

G. N. BAUM, *Assistant Examiner.*